United States Patent
Savir et al.

(10) Patent No.: US 12,058,117 B2
(45) Date of Patent: Aug. 6, 2024

(54) USER IDENTITY VERIFICATION USING DYNAMIC IDENTIFICATION POLICIES

(71) Applicant: Dell Products L.P., Round Rock, TX (US)

(72) Inventors: Amihai Savir, Sansana (IL); Jehuda Shemer, Kfar Saba (IL); Stav Sapir, Beer-Sheva (IL); Naor Radami, Shokeda (IL)

(73) Assignee: Dell Products L.P., Round Rock, TX (US)

( * ) Notice: Subject to any disclaimer, the term of this patent is extended or adjusted under 35 U.S.C. 154(b) by 409 days.

(21) Appl. No.: 17/489,977

(22) Filed: Sep. 30, 2021

(65) Prior Publication Data
US 2023/0098558 A1    Mar. 30, 2023

(51) Int. Cl.
*H04L 9/40* (2022.01)

(52) U.S. Cl.
CPC ............ *H04L 63/08* (2013.01); *H04L 63/108* (2013.01); *H04L 63/1441* (2013.01)

(58) Field of Classification Search
CPC . H04L 63/0884; H04L 63/08; H04L 63/1441; H04L 63/108
USPC .......................................................... 726/10
See application file for complete search history.

(56) References Cited

U.S. PATENT DOCUMENTS

2019/0370793 A1    12/2019    Zhu et al.
2022/0131846 A1*    4/2022    Shiner .................. H04L 9/3268
2022/0131848 A1*    4/2022    Shiner .................. H04L 63/126

OTHER PUBLICATIONS

Wackerow et al., "Proof-of-Stake (POS)", https://ethereum.org/en/developers/docs/consensus-mechanisms/pos/, downloaded on Sep. 21, 2021.

* cited by examiner

*Primary Examiner* — Benjamin A Kaplan
(74) *Attorney, Agent, or Firm* — Ryan, Mason & Lewis, LLP

(57) ABSTRACT

Techniques are provided for user identity verification using dynamic identification policies. One method comprises obtaining, by an identity management server, a validation request to evaluate an identity of a user, wherein the validation request is processed by the identity management server in connection with an access request of the user to access a protected resource provided by a service provider that is distinct from the identity management server. The validation request may comprise an identification policy, generated by the service provider in response to receiving the access request, that specifies authentication consensus constraints that apply to the access request. The identity management server can provide an authentication request to verifier devices in a verifier pool, using the authentication consensus constraints, to evaluate the identity of the user; and can provide an identity validation result based on the evaluation of the identity of the user by the verifier devices using the authentication consensus constraints.

20 Claims, 7 Drawing Sheets

USER IDENTITY VERIFICATION USING DYNAMIC IDENTIFICATION POLICIES

FIELD

The field relates generally to information processing techniques and more particularly, to evaluation of user identities in such information processing systems.

BACKGROUND

User identification techniques often employ cryptographic certificates, especially in the context of Public Key Infrastructure (PKI). PKI techniques rely on the trustworthiness of the Certificate Authorities (CAs) that issue the cryptographic certificates. A CA behaves in a similar manner as a notary public and has a responsibility to properly ascertain the identity of a user. The CA provides an endorsement of the user by signing a certificate of the user.

A need exists for improved techniques for verifying user identities.

SUMMARY

In one embodiment, a method comprises obtaining, by an identity management server, a validation request to evaluate an identity of a user, wherein the validation request is processed by the identity management server in connection with an access request of the user to access a protected resource provided by a service provider that is distinct from the identity management server, wherein the validation request comprises an identification policy generated by the service provider in response to receiving the access request, and wherein the identification policy specifies one or more authentication consensus constraints that apply to the access request; providing, by the identity management server, an authentication request to one or more verifier devices in a verifier pool, using the one or more authentication consensus constraints in the identification policy, to evaluate the identity of the user; and providing an identity validation result based at least in part on the evaluation of the identity of the user by the one or more verifier devices in the verifier pool using the one or more authentication consensus constraints in the identification policy, wherein the access request is processed at least in part based on the identity validation result.

In some embodiments, the identification policy further comprises one or more verification fee constraints based at least in part on a potential exposure associated with the access request. The one or more authentication consensus constraints in the identification policy may be based at least in part on a potential exposure associated with the access request.

In at least one embodiment, the identity of the user and/or an identifier of one or more verifier devices in the verifier pool can be stored in a false identity registry in response to the identity of the user being determined to be invalid within a specified time duration.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for user identity verification using dynamic identification policies, such as container images.

Figure 1:
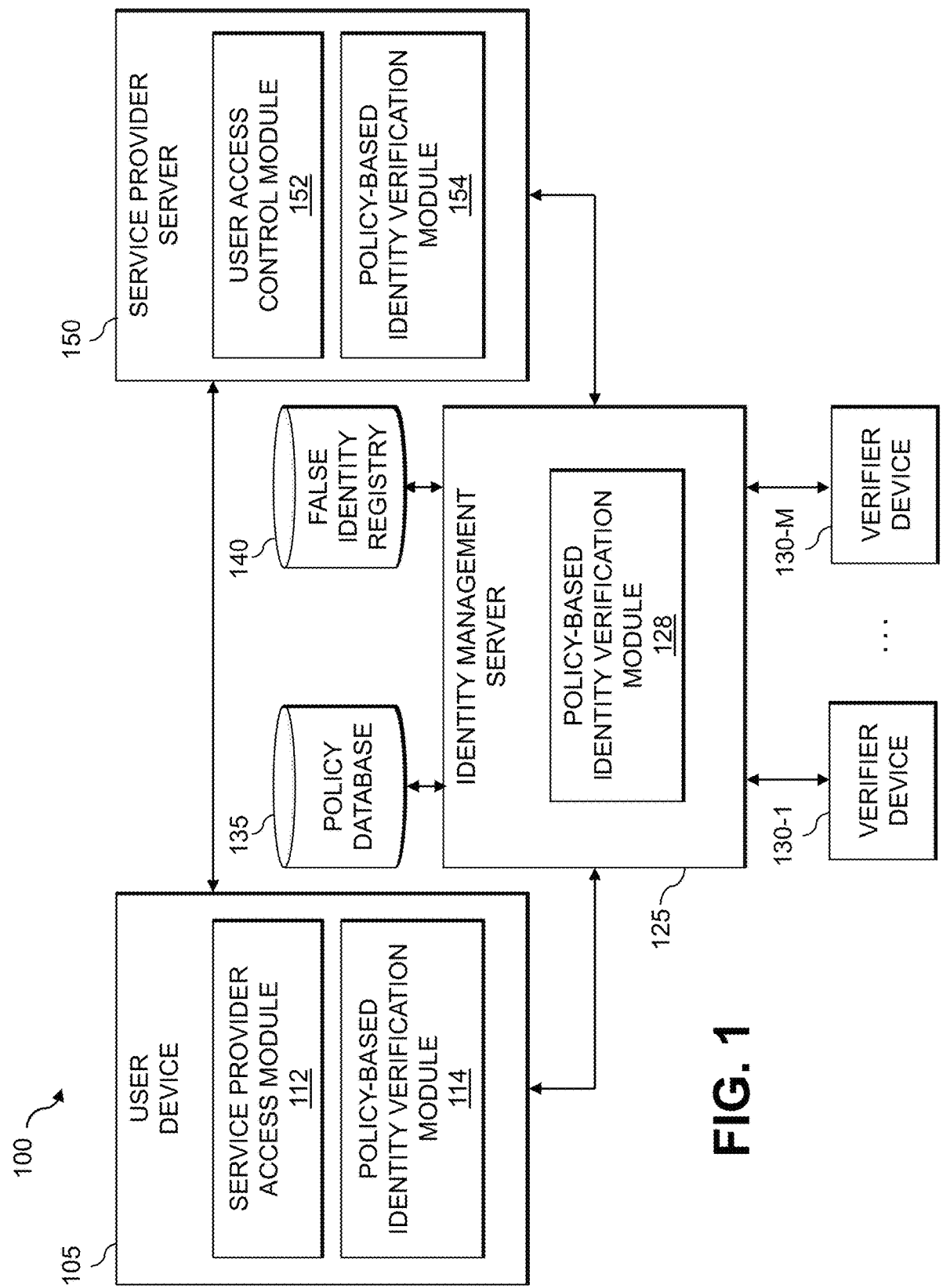
FIG. 1 illustrates an information processing system configured for user identity verification using dynamic identification policies in accordance with an illustrative embodiment.

FIG. 1 shows an information processing system 100 configured in accordance with an illustrative embodiment. The information processing system 100 comprises a user device 105, an identity management server 125, a service provider server 150 and verifier devices 130-1 through 130-M in a verifier pool. In the example of FIG. 1, a user of the user device 105 attempts to access a protected resource provided by the service provider server 150 and the identity management server 125 implements at least portions of the disclosed techniques for policy-based user identity verification, as discussed further below. The verifier devices 130 in the verifier pool may implement a consensus mechanism to evaluate the identity of the user. Consensus mechanisms allow distributed systems to work together to establish consensus among database nodes, application servers, and other enterprise infrastructure. More recently, consensus protocols have been used to allow cryptographic economic systems, such as Ethereum, to agree on the state of a network.

A consensus mechanism in a cryptographic economic system can also help prevent certain kinds of economic attacks. In theory, an attacker can compromise consensus by controlling 51% of the network. Consensus mechanisms are designed to make this "51% attack" unfeasible. Different mechanisms are engineered to solve this security problem differently. A 51% attack is typically considered to be riskier for the attackers. To do so, an attacker would need to control 51% of the staked Ethereum (possibly causing the Ethereum value to drop). There is little, if any, incentive to destroy the value of a currency that you have a majority stake in. There are stronger incentives, however, to keep the network secure and healthy.

The term "service provider" as used herein is intended to be broadly construed so as to encompass, by way of illustration and without limitation, a provider of a service, a provider of a resource, such as a web site, an application or an account, and other providers requiring a secure identification of a user attempting to log in and perform some action. In at least some embodiments, the service provider server 150 is a consumer of the identity management server 125.

The user device 105 may be implemented, for example, as a host device and/or another device such as a mobile telephone, a laptop computer, a tablet computer, a desktop computer or another type of computing device. Such devices are examples of what are more generally referred to herein as "processing devices." Some of these processing devices are also generally referred to herein as "computers." When the user device 105 is implemented as a host device, the host device may illustratively comprise one or more servers or other types of computers of an enterprise computer system, cloud-based computer system or other arrangement of multiple compute nodes associated with respective users.

The user device 105, the identity management server 125 and/or the service provider server 150 may be coupled to a network, where the network in this embodiment is assumed to represent a sub-network or other related portion of a larger computer network. The network is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The user device 105, the identity management server 125 and/or the service provider server 150 illustratively comprise processing devices of one or more processing platforms. For example, the user device 105 can comprise one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

The user device 105, the identity management server 125 and/or the service provider server 150 can additionally or alternatively be part of cloud infrastructure such as an Amazon Web Services (AWS) system. Other examples of cloud-based systems that can be used to provide at least portions of the user device 105, the identity management server 125 and/or the service provider server 150 include Google Cloud Platform (GCP) and Microsoft Azure.

As shown in FIG. 1, the exemplary user device 105 comprises a service provider access module 112 and a policy-based identity verification module 114, as discussed further below in conjunction with FIGS. 3 and 4. In one or more embodiments, the service provider access module 112 may be used in connection with a request by the user to access one or more resources provided by the service provider server 150. The policy-based identity verification module 114 implements the client-side functionality of the disclosed techniques for user identity verification using dynamic identification policies.

It is to be appreciated that this particular arrangement of modules 112, 114 illustrated in the user device 105 of the FIG. 1 embodiment is presented by way of example only, and alternative arrangements can be used in other embodiments. For example, the functionality associated with modules 112, 114 in other embodiments can be combined into a single module, or separated across a larger number of modules. As another example, multiple distinct processors and/or memory elements can be used to implement different ones of modules 112, 114 or portions thereof. At least portions of modules 112, 114 may be implemented at least in part in the form of software that is stored in memory and executed by a processor.

In the example of FIG. 1, the exemplary identity management server 125 comprises a policy-based identity verification module 128. In some embodiments, the identity management server 125 ensures that the proper people in an enterprise have the appropriate access to resources. The exemplary policy-based identity verification module 128 implements at least a portion of the disclosed techniques for user identity verification using dynamic identification policies, as discussed further below in conjunction with FIGS. 3 and 4. The functionality associated with module 128 in other embodiments can be separated across a larger number of modules. In addition, multiple distinct processors and/or memory elements can be used to implement module 128 or portions thereof. At least portions of module 128 may be implemented at least in part in the form of software that is stored in memory and executed by a processor.

As shown in FIG. 1, the exemplary service provider server 150 comprises a user access control module 152 and a policy-based identity verification module 154, as discussed further below in conjunction with FIGS. 3 and 4. In one or more embodiments, the user access control module 152 may be used by the service provider server 150 in connection with a request by the user to access one or more resources provided by the service provider server 150. The policy-based identity verification module 154 implements the service provider functionality of the disclosed techniques for user identity verification using dynamic identification policies.

It is to be appreciated that this particular arrangement of modules 152, 154 illustrated in the service provider server 150 of the FIG. 1 embodiment is presented by way of example only, and alternative arrangements can be used in other embodiments. For example, the functionality associated with modules 152, 154 in other embodiments can be combined into a single module, or separated across a larger number of modules. As another example, multiple distinct processors and/or memory elements can be used to implement different ones of modules 152, 154 or portions thereof. At least portions of modules 152, 154 may be implemented at least in part in the form of software that is stored in memory and executed by a processor.

The user device 105, the identity management server 125 and/or the service provider server 150 may further include one or more additional modules and other components typically found in conventional implementations of such devices, although such additional modules and other components are omitted from the figure for clarity and simplicity of illustration.

The user device 105, the identity management server 125 and/or the service provider server 150 in the FIG. 1 embodiment may be implemented on a common processing platform, or on separate processing platforms. In the FIG. 1 embodiment, the user device 105, the identity management server 125 and the service provider server 150 are assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user device 105, the identity management server 125 and/or the service provider server 150 to reside in different data centers. Numerous other distributed implementations of the components of the system 100 are possible.

In the example of FIG. 1, the identity management server 125 has (i) an associated policy database 135 configured to store one or more identification policies, discussed further below in conjunction with FIG. 2, for example; and/or (ii) an associated false identity registry 140 configured to store an identity of a user and/or an identifier of the one or more verifier devices 130 in a verifier pool in response to the identity of the user being determined to be invalid within a specified time duration. For example, if the service provider server 150 determines that a validated identity was invalid within a specified time duration, then the validated identity and/or an identifier of the one or more verifier devices 130 in the verifier pool that validated the identity can be stored in the false identity registry 140. Similarly, if one or more verifier devices 130 in the verifier pool that validated the identity later determines that a validated identity was invalid within the specified time duration, then the validated identity can be stored in the false identity registry 140. In some embodiments, the false identity registry 140 can be publicly accessible (and/or accessible to one or more service provider servers 150) to coordinate a tracking of imposters or to be used as a "wall of shame" for the verifier devices 130 so there is a consequence for an improper user identity verification.

Although the policy database 135 and the false identity registry 140 are shown in FIG. 1 as being stored in separate databases, in other embodiments, the policy database 135 and the false identity registry 140 can be stored in a single database. An additional or alternative instance of the policy database 135 and/or the false identity registry 140, or portions thereof, may be incorporated into the identity management server 125 or other portions of the system 100, such as the service provider server 150.

The false identity registry 140 may be implemented, at least in some embodiments, as a database or a secure ledger. The false identity registry 140 in other embodiments may be implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the user device 105, the identity management server 125 and/or the service provider server 150 can be one or more input/output devices (not shown), which illustratively comprise keyboards, displays or other types of input/output devices in any combination. Such input/output devices can be used, for example, to support one or more user interfaces to a user device, as well as to support communication between the user device 105, the identity management server 125, the service provider server 150 and/or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for policy-based user identity verification is presented by way of illustrative example only, and in other embodiments additional or alternative elements may be used. Thus, another embodiment includes additional or alternative systems, devices and other network entities, as well as different arrangements of modules and other components.

Figure 2:
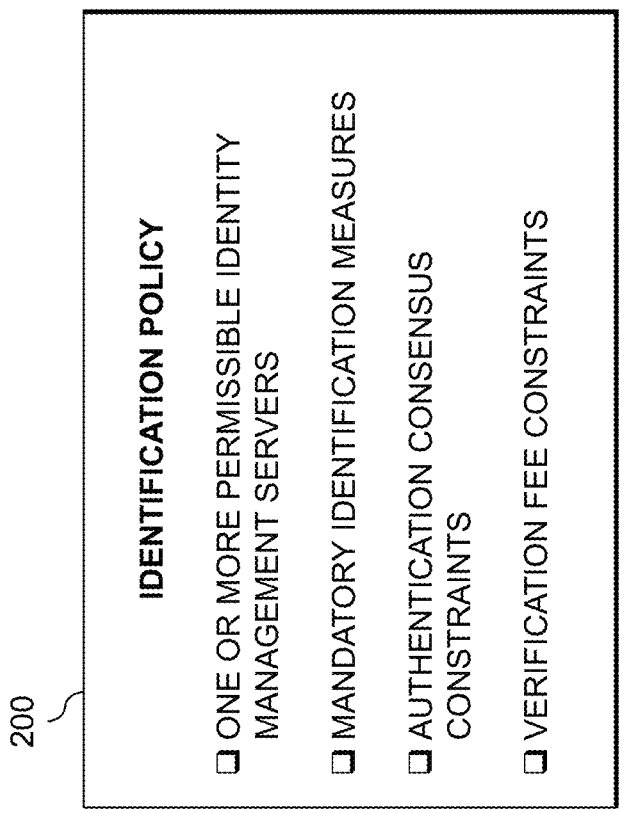
FIG. 2 illustrates an exemplary identification policy template according to one or more embodiments.

FIG. 2 illustrates an exemplary identification policy template 200 according to one or more embodiments. In the example of FIG. 2, the identification policy template 200 identifies one or more permissible identity management servers 125; one or more mandatory identification measures (e.g., a token, a certificate, a biometric element and/or two factor authentication); one or more authentication consensus constraints (e.g., a number of identity management servers 125 or a number of verifier devices 130 required in the verifier pool, for example, to spread the risk among multiple verifier devices 130 when there is a significant exposure in connection with the proposed action(s) of the user); and one or more verification fee constraints. For example, the verification fee constraints may specify a fee that the service provider server 150 is willing to pay for a proper identification of a user. The fee may be based at least in part, for example, on a probability of a legitimate user performing a non-legitimate action, a sensitivity of the data, if compromised, and a time duration of the verification. In at least some embodiments, the pool of verifier devices 130 may perform an authentication of a specific user and risk their personal stake as defined in a proof of stake model. The time duration of the verification can range in various embodiments from a one-time authentication (e.g., seconds) to years in theory. A shorter period means less risk for the identity management server 125 but more risk to the service provider server 150.

As noted above, user identification often relies on the trustworthiness of the CAs. Generally, a service provider server 150 trusts the CA and the CA vouches for the user and signs a certificate of the user as a stamp of approval. With existing techniques, a CA will get paid for each user identification, but it is unlikely that the CA will lose anything for an improper user identification.

In some embodiments of the disclosed techniques for user identity verification using dynamic identification policies, the verification fee constraints can be based at least in part on financial motivation and/or an economic model (e.g., the gain and penalty for the identity management server 125 can be tied to the risk involved to the service provider server 150, such that the higher the risk to the service provider server 150, the more that the service provider server 150 is willing to pay for proper identification and the higher the penalty to the identity management server 125 if the user identification is not properly performed). For example, an identity management server 125 can be paid a higher fee when the risk is greater, and can lose money in some situations if they did not perform the user identification properly.

In one or more embodiments, the disclosed techniques for policy-based user identity verification employ a proof of stake mechanism to endorse user identities. Proof of stake is a type of consensus mechanism used by blockchain networks to achieve distributed consensus. The identity management server 125 provides a stake (e.g., in the form of money or cryptocurrency to cover any losses by the service provider server 150) to guarantee a user identity for a specified time period, and the identity management server 125 gets paid for their services. If the user identification is not properly performed, the identity management server 125 may lose their stake (or a portion thereof). The service provider server 150 may require a higher stake from identity management server 125 at a higher cost to the service provider server 150. Multiple stakeholders can also be used to independently prove a user identity (e.g., using multiple verifier devices 130 in a verifier pool).

Figure 3:
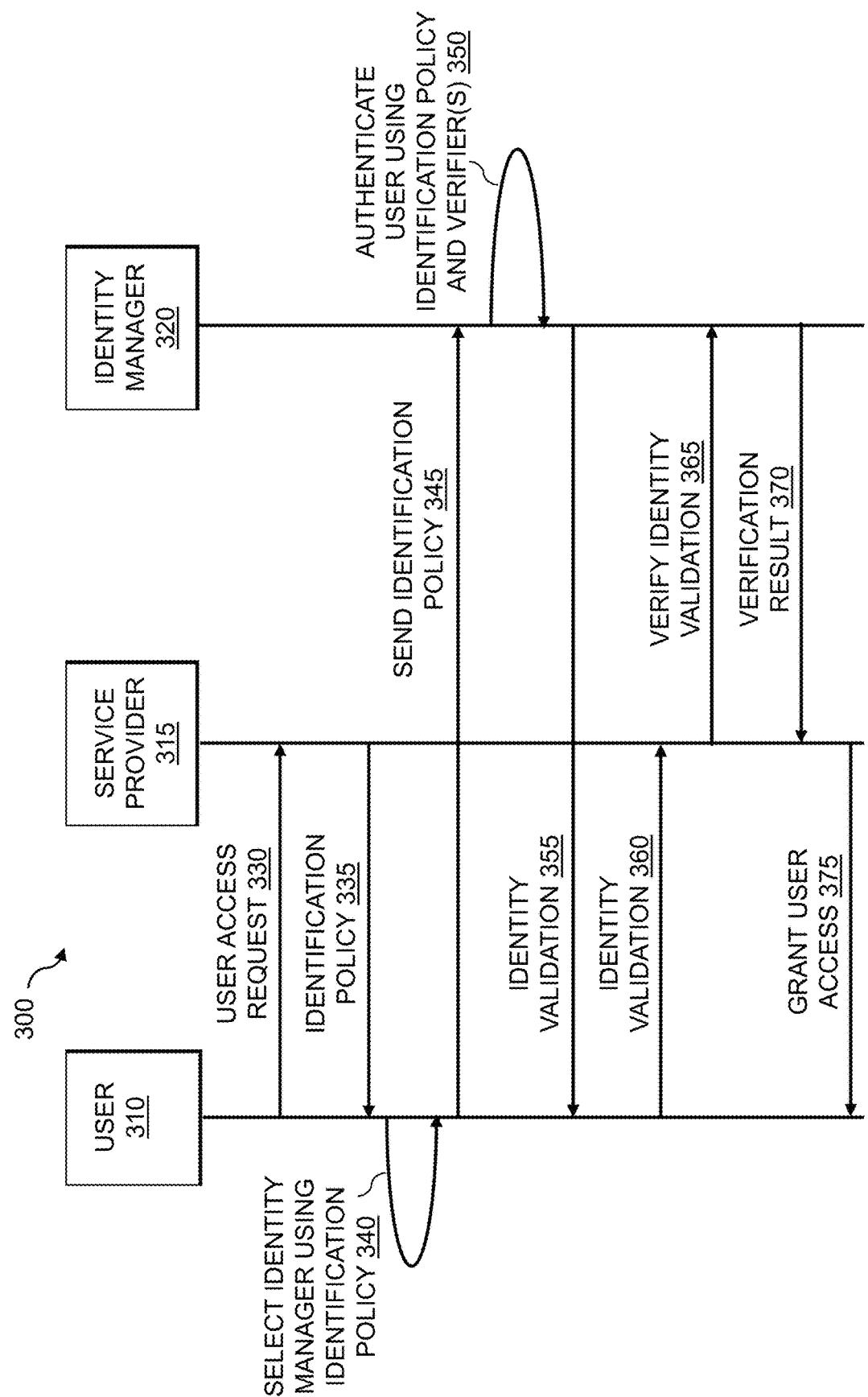
FIG. 3 illustrates a communication diagram for a policy-based user identity verification process, according to one embodiment of the disclosure.

FIG. 3 illustrates a communication diagram for a policy-based user identity verification process 300, according to one embodiment of the disclosure. In the example of FIG. 3, a user 310 initially requests to access a service provider 315 in step 330. The service provider 315 replies with an identification policy in step 335. The user 310 analyzes the identification policy and selects an identity manager 320 in step 340. In step 345, the user 310 sends the provided identification policy to a selected identity manager 320 (e.g., an identity management server 125).

The selected identity manager 320 then authenticates the user in step 350 using the identification policy and one or more verifiers in a verifier pool, as discussed further below in conjunction with FIG. 4. The selected identity manager 320 then provides an identity validation to the user 310 in step 355. The user 310, in turn, provides the identity validation to the service provider 315 in step 360. The service provider 315 sends a request to the selected identity manager 320 in step 365 to verify the identity validation. The selected identity manager 320 provides a verification result to the service provider 315 in step 370, and the service provider 315 grants access to the user 310 in step 375.

In some embodiments, the service provider 315 can provide the identification policy of step 335 directly to an identity manager 320, without sending it through the user 310, and the identity manager 320 can provide the identity validation of step 355 directly to the service provider 315.

Figure 4:
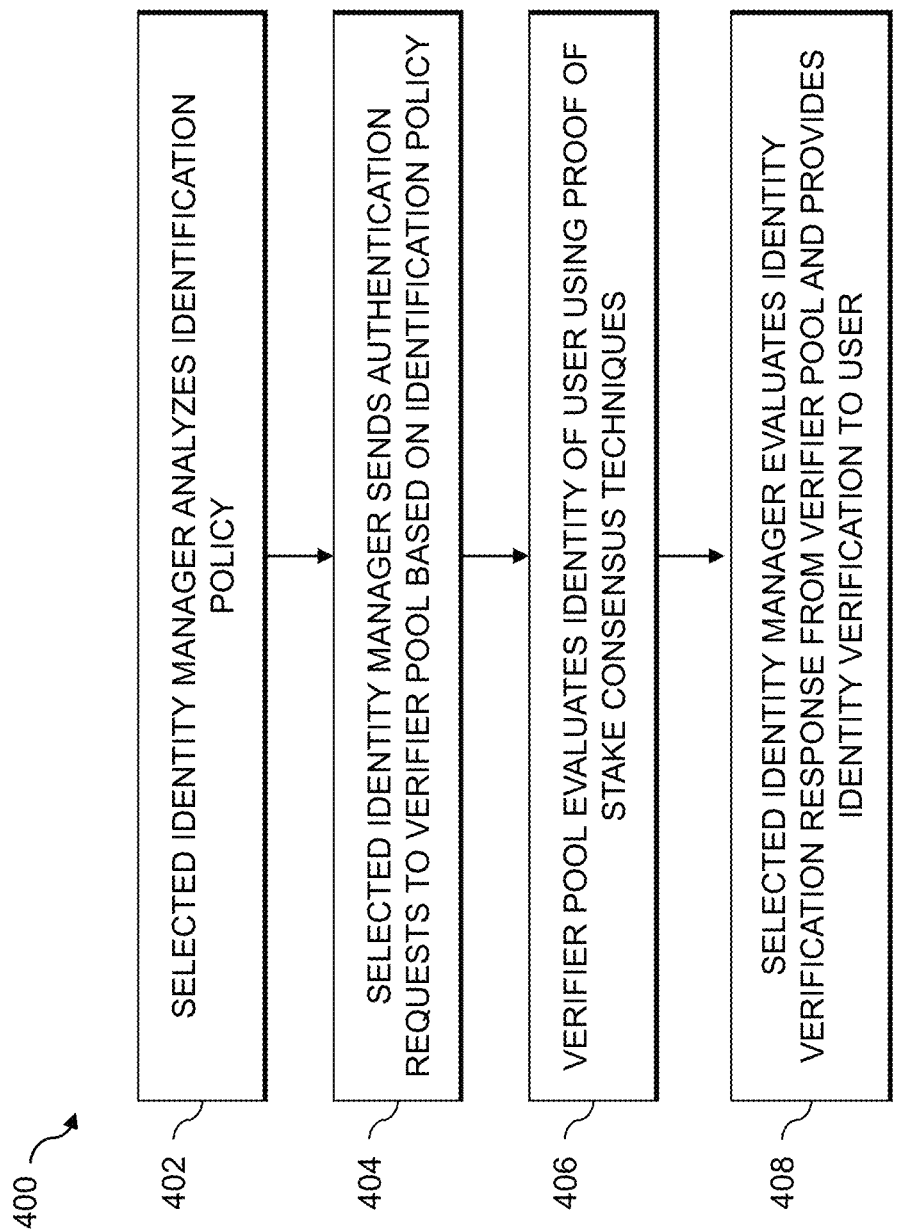
FIG. 4 is a flow diagram illustrating an exemplary implementation of an authentication process using an applicable identification policy and a verifier pool, according to various embodiments.

FIG. 4 is a flow diagram illustrating an exemplary implementation of a user authentication process 400 using an applicable identification policy and a verifier pool, according to various embodiments. The authentication of the user in step 350 of the policy-based user identity verification process 300 of FIG. 3 can be performed in some embodiments using the user authentication process 400 of FIG. 4.

In the example of FIG. 4, the selected identity manager initially analyzes the applicable identification policy in step 402 and sends appropriate authentication requests to one or more verifier devices 130 in a verifier pool in step 404 based at least in part on the identification policy. The verifier devices 130 in the verifier pool evaluate an identity of the user in step 406 using proof of stake consensus techniques. Finally, the selected identity manager 320 evaluates an identity verification response from the verifier pool and provides an identity verification to the user 310 (or directly to the service provider 315) in step 408.

Figure 5:
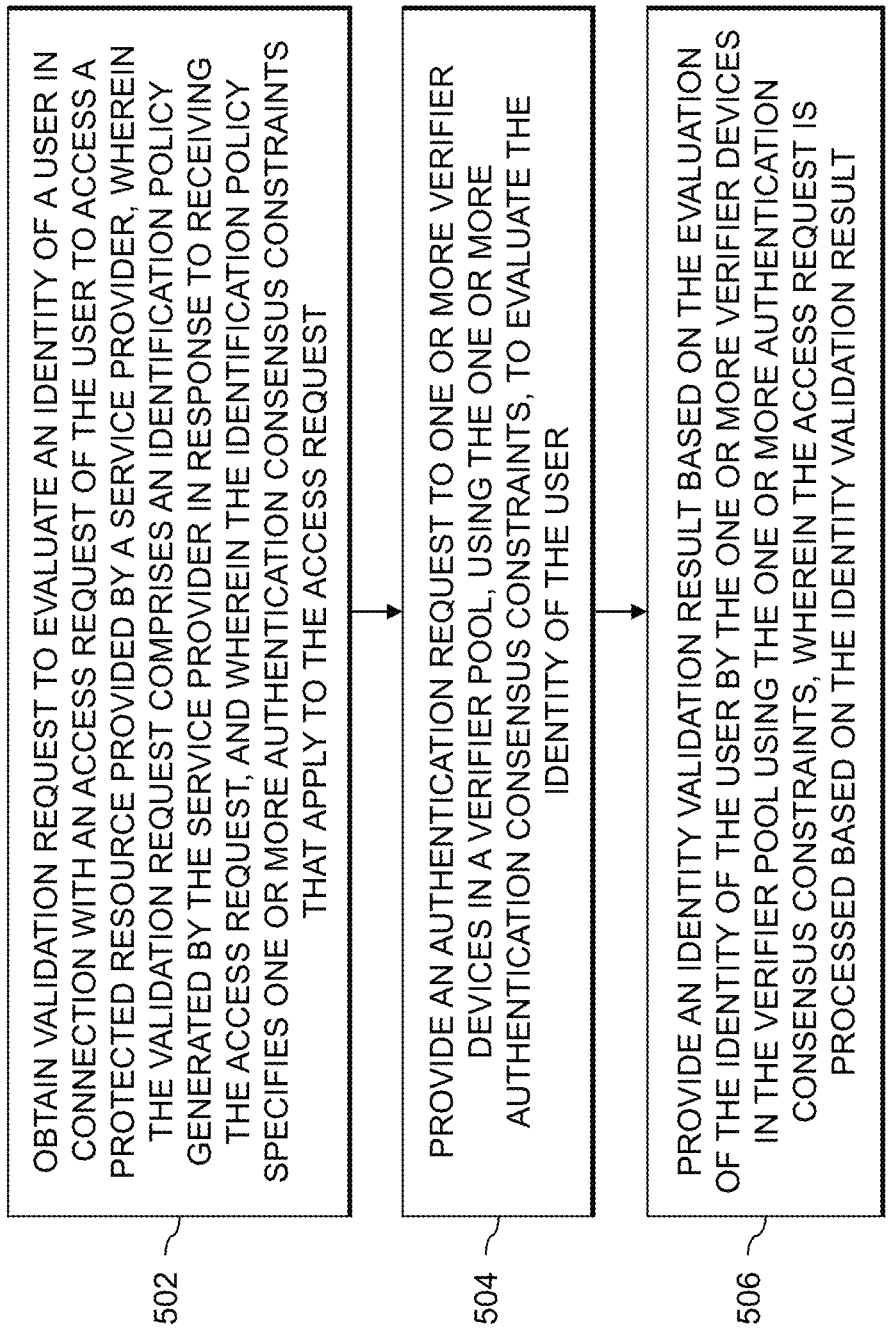
FIG. 5 is a flow diagram illustrating an exemplary implementation of a policy-based process for user identity verification, according to one or more embodiments.

FIG. 5 is a flow diagram illustrating an exemplary implementation of a policy-based process 500 for user identity verification, according to one or more embodiments. In the example of FIG. 5, the policy-based process 500 initially obtains (e.g., by an identity management server) a validation request in step 502 to evaluate an identity of a user, in connection with an access request of the user to access a protected resource provided by a service provider. The obtained validation request comprises an identification policy, generated by the service provider in response to receiving the access request, that specifies one or more authentication consensus constraints that apply to the access request.

In step 504, an authentication request is provided (for example, by the identity management server) to one or more verifier devices in a verifier pool, using the one or more authentication consensus constraints in the identification policy, to evaluate the identity of the user. An identity validation result is provided in step 506 based on the evaluation of the identity of the user by the one or more verifier devices in the verifier pool using the one or more authentication consensus constraints in the identification policy. The access request is processed at least in part based on the identity validation result.

In some embodiments, the identification policy further comprises (i) a specification of one or more required identification measures, and/or (ii) one or more verification fee constraints based at least in part on a potential exposure associated with the access request. The authentication consensus constraints in the identification policy can be based, for example, on a potential exposure associated with the access request. The verifier devices in the verifier pool may employ proof-of-stake techniques.

In one or more embodiments, the identity validation result is valid for a specified time duration. The identity of the user and/or an identifier of the one or more verifier devices in the verifier pool can be stored in a false identity registry in response to the identity being determined to be invalid within the specified time duration.

The particular processing operations and other network functionality described in conjunction with the flow diagram of FIG. 5 are presented by way of illustrative example only, and should not be construed as limiting the scope of the disclosure in any way. Alternative embodiments can use other types of processing operations for user identity verification using dynamic identification policies. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for verifying user identities using dynamic identification policies. The foregoing applications and associated embodiments should be considered as illustrative only, and numerous other embodiments can be configured using the techniques disclosed herein, in a wide variety of different applications.

As noted above, the verification fee constraints in an identification policy may specify a fee that the service provider server 150 is willing to pay for a proper identification of a user. The fee may be based at least in part, for example, on (i) a probability of a legitimate user performing a non-legitimate action, (ii) a sensitivity of the data, if compromised, and (iii) a time duration of the verification. In at least some embodiments, the pool of verifier devices 130 may perform an authentication of a specific user and risk their personal stake as defined in a proof of stake model. The time duration of the verification can range in various embodiments from a one-time authentication (e.g., seconds) to years in theory. A shorter period means less risk for the identity management server 125 but more risk to the service provider server 150.

In this manner, the verification fee constraints can be based on financial motivation and/or an economic model (e.g., the gain and/or penalty for the identity management server 125 can be tied to the risk involved to the service provider server 150, such that the higher the risk to the service provider server 150, the more that the service provider server 150 is willing to pay for proper identification and the higher the penalty to the identity management server 125 if the user identification is not properly performed). Among other benefits, the disclosed policy-based user identity verification techniques allow an identity management server 125 to be paid a higher fee when the risk is greater, and to lose money in some situations if they did not perform the user identification properly.

It should also be understood that the disclosed techniques for user identity verification using dynamic identification policies, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for verifying user identities using dynamic identification policies may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS, IaaS and/or a Function-as-a-Service FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based policy-based user identity verification engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based policy-based user identity verification platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Figure 6:
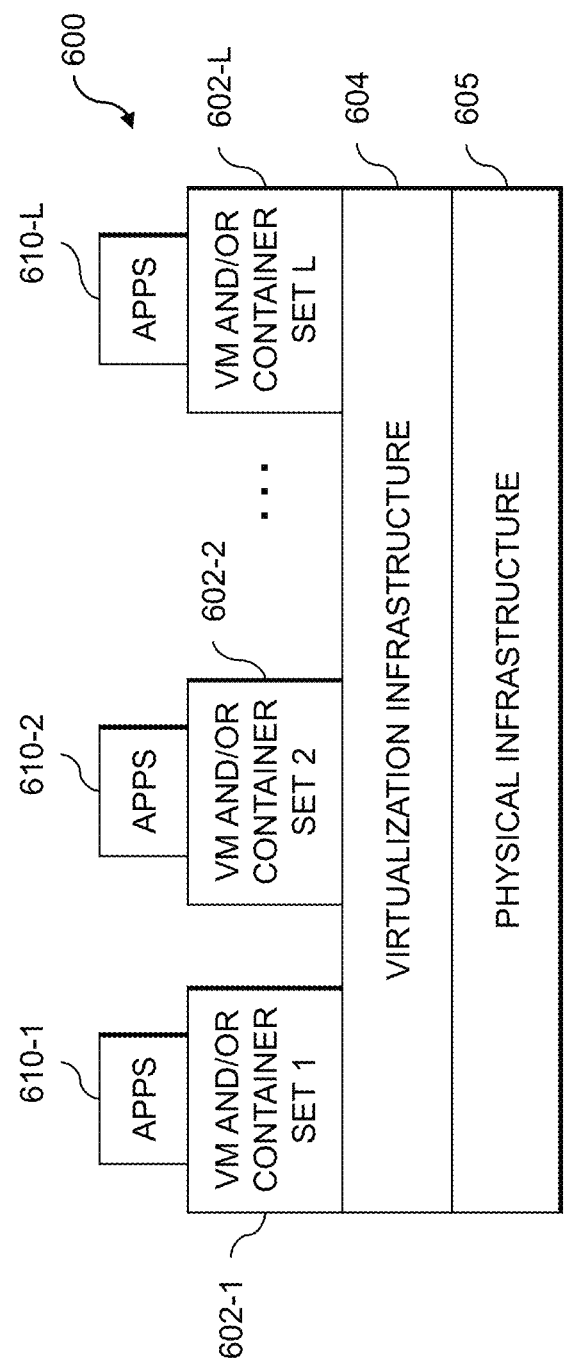
FIG. 6 illustrates an exemplary processing platform that may be used to implement at least a portion of one or more embodiments of the disclosure comprising a cloud infrastructure.

Illustrative embodiments of processing platforms will now be described in greater detail with reference to FIGS. 6 and 7. These platforms may also be used to implement at least portions of other information processing systems in other embodiments. FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide policy-based user identity verification functionality of the type described above for one or more processes running on a given one of the VMs. For example, each of the VMs can implement policy-based user identity verification control logic and associated functionality for maintaining a false identity registry for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide policy-based user identity verification functionality of the type described above for one or more processes running on different ones of the containers. For example, a container host device supporting multiple containers of one or more container sets can implement one or more instances of policy-based user identity verification control logic and associated functionality for maintaining a false identity registry.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
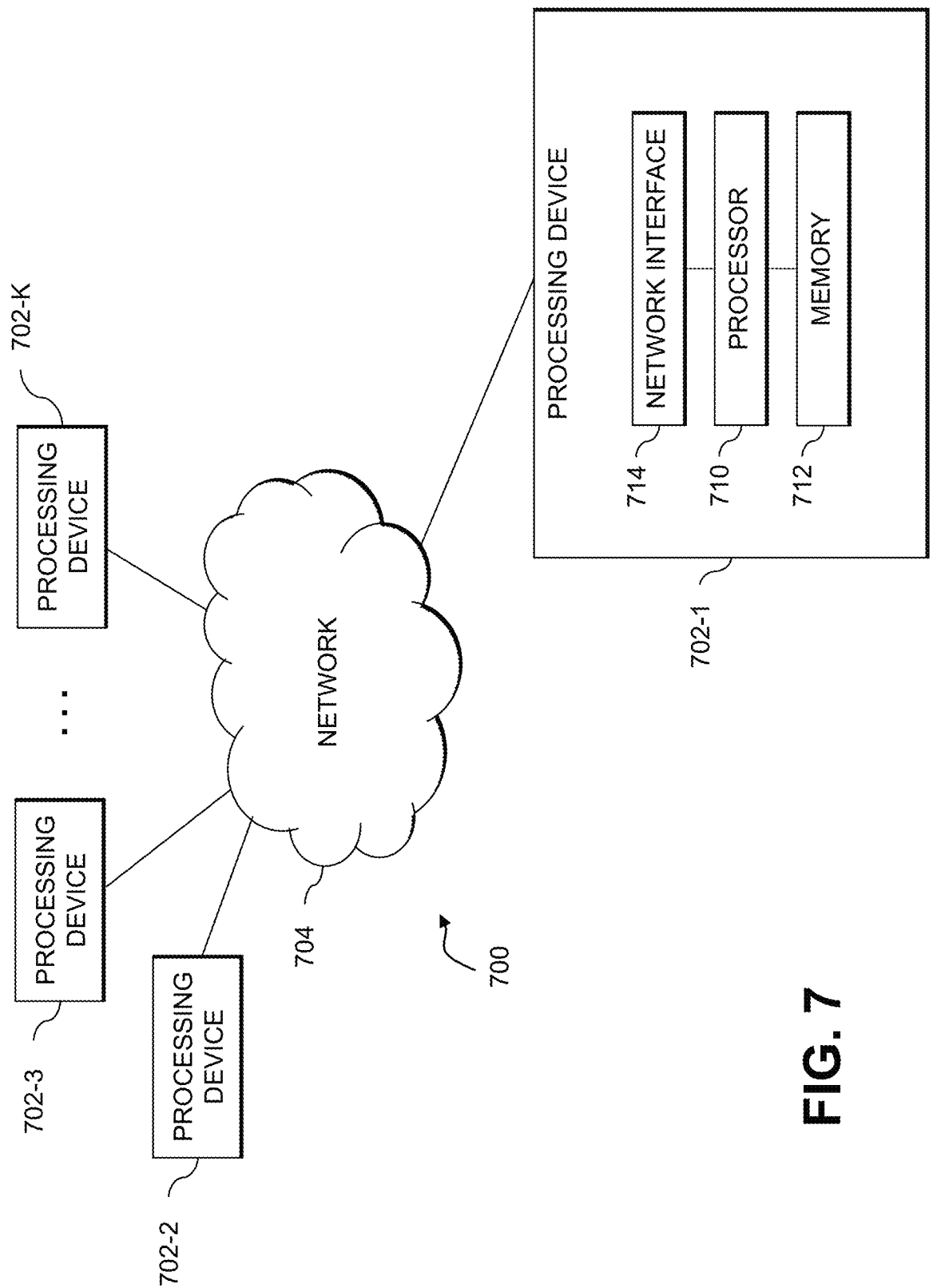
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining, by an identity management server, a validation request to evaluate an identity of a user, wherein the validation request is processed by the identity management server in connection with an access request of the user to access a protected resource provided by a service provider that is distinct from the identity management server, wherein the validation request comprises an identification policy generated by the service provider in response to receiving the access request, and wherein the identification policy specifies one or more authentication consensus constraints that apply to the access request;
    providing, by the identity management server, an authentication request to one or more verifier devices in a verifier pool, using the one or more authentication consensus constraints in the identification policy, to evaluate the identity of the user; and
    providing an identity validation result based at least in part on the evaluation of the identity of the user by the one or more verifier devices in the verifier pool using the one or more authentication consensus constraints in the identification policy, wherein the access request is processed at least in part based on the identity validation result;
    wherein the method is performed by at least one processing device comprising a processor coupled to a memory.

2. The method of claim 1, wherein the identification policy further comprises a specification of one or more required identification measures.

3. The method of claim 1, wherein the identification policy further comprises one or more verification fee constraints based at least in part on a potential exposure associated with the access request.

4. The method of claim 1, wherein the one or more authentication consensus constraints in the identification policy are based at least in part on a potential exposure associated with the access request.

5. The method of claim 1, wherein the one or more verifier devices in the verifier pool evaluate a probability that the user performs one or more non-legitimate actions.

6. The method of claim 1, wherein the one or more verifier devices in the verifier pool employ proof-of-stake techniques.

7. The method of claim 1, wherein the identity validation result is valid for a specified time duration.

8. The method of claim 7, further comprising storing one or more of the identity of the user and an identifier of one or more verifier devices in the verifier pool in a false identity registry in response to the identity of the user being determined to be invalid within the specified time duration.

9. The method of claim 1, wherein the providing the identity validation result further comprises the identity management server evaluating one or more identity verification responses from the one or more verifier devices in the verifier pool to determine the identity validation result.

10. The method of claim 1, wherein the user selects the identity management server from a list of one or more permissible identity management servers in the identification policy.

11. An apparatus comprising:
    at least one processing device comprising a processor coupled to a memory;
    the at least one processing device being configured to implement the following steps:
    obtaining, by an identity management server, a validation request to evaluate an identity of a user, wherein the validation request is processed by the identity management server in connection with an access request of the user to access a protected resource provided by a service provider that is distinct from the identity management server, wherein the validation request comprises an identification policy generated by the service provider in response to receiving the access request, and wherein the identification policy specifies one or more authentication consensus constraints that apply to the access request;
    providing, by the identity management server, an authentication request to one or more verifier devices in a verifier pool, using the one or more authentication consensus constraints in the identification policy, to evaluate the identity of the user; and
    providing an identity validation result based at least in part on the evaluation of the identity of the user by the one or more verifier devices in the verifier pool using the one or more authentication consensus constraints in the identification policy, wherein the access request is processed at least in part based on the identity validation result.

12. The apparatus of claim 11, wherein the identification policy further comprises one or more verification fee constraints based at least in part on a potential exposure associated with the access request.

13. The apparatus of claim 11, wherein the one or more authentication consensus constraints in the identification policy are based at least in part on a potential exposure associated with the access request.

14. The apparatus of claim 11, wherein the one or more verifier devices in the verifier pool evaluate a probability that the user performs one or more non-legitimate actions.

15. The apparatus of claim 11, further comprising storing one or more of the identity of the user and an identifier of one or more verifier devices in the verifier pool in a false identity registry in response to the identity of the user being determined to be invalid within a specified time duration.

16. A non-transitory processor-readable storage medium having stored therein program code of one or more software programs, wherein the program code when executed by at least one processing device causes the at least one processing device to perform the following steps:
    obtaining, by an identity management server, a validation request to evaluate an identity of a user, wherein the validation request is processed by the identity management server in connection with an access request of the user to access a protected resource provided by a service provider that is distinct from the identity management server, wherein the validation request comprises an identification policy generated by the service provider in response to receiving the access request, and wherein the identification policy specifies one or more authentication consensus constraints that apply to the access request;

providing, by the identity management server, an authentication request to one or more verifier devices in a verifier pool, using the one or more authentication consensus constraints in the identification policy, to evaluate the identity of the user; and providing an identity validation result based at least in part on the evaluation of the identity of the user by the one or more verifier devices in the verifier pool using the one or more authentication consensus constraints in the identification policy, wherein the access request is processed at least in part based on the identity validation result.

17. The non-transitory processor-readable storage medium of claim 16, wherein the identification policy further comprises one or more verification fee constraints based at least in part on a potential exposure associated with the access request.

18. The non-transitory processor-readable storage medium of claim 16, wherein the one or more authentication consensus constraints in the identification policy are based at least in part on a potential exposure associated with the access request.

19. The non-transitory processor-readable storage medium of claim 16, wherein the one or more verifier devices in the verifier pool evaluate a probability that the user performs one or more non-legitimate actions.

20. The non-transitory processor-readable storage medium of claim 16, further comprising storing one or more of the identity of the user and an identifier of one or more verifier devices in the verifier pool in a false identity registry in response to the identity of the user being determined to be invalid within a specified time duration.

* * * * *